(12) United States Patent
Shirkhodai et al.

(10) Patent No.: US 11,227,477 B2
(45) Date of Patent: Jan. 18, 2022

(54) SYSTEMS AND METHODS FOR DETERMINING MAXIMUM ALERT GEOGRAPHY FOR A HAZARD

(71) Applicant: UNIVERSITY OF HAWAII, Honolulu, HI (US)

(72) Inventors: Ray Shirkhodai, Kihei, HI (US); David Askov, Seattle, WA (US); Douglas B. Bausch, Makawao, HI (US)

(73) Assignee: University of Hawaii, Honolulu, HI (US)

( * ) Notice: Subject to any disclaimer, the term of this patent is extended or adjusted under 35 U.S.C. 154(b) by 0 days.

(21) Appl. No.: 16/979,217

(22) PCT Filed: May 14, 2019

(86) PCT No.: PCT/US2019/032121
§ 371 (c)(1),
(2) Date: Sep. 9, 2020

(87) PCT Pub. No.: WO2019/222149
PCT Pub. Date: Nov. 21, 2019

(65) Prior Publication Data
US 2021/0056830 A1  Feb. 25, 2021

Related U.S. Application Data

(60) Provisional application No. 62/672,254, filed on May 16, 2018.

(51) Int. Cl.
*G08B 25/00* (2006.01)
*G08B 21/10* (2006.01)
(Continued)

(52) U.S. Cl.
CPC ............ *G08B 21/10* (2013.01); *H04W 4/022* (2013.01); *H04W 4/90* (2018.02); *H04W 76/50* (2018.02)

(58) Field of Classification Search
CPC ....... H04W 4/02; H04W 64/00; H04W 4/029; H04W 4/024; H04W 4/90; H04W 4/022; H04W 4/46; H04W 56/006; H04W 56/0065; H04W 76/50; H04W 84/18; G08B 21/10; G08B 27/006; G08B 31/00;
(Continued)

(56) References Cited

U.S. PATENT DOCUMENTS

| | | | |
|---|---|---|---|
| 6,169,476 B1 | 1/2001 | Flanagan | |
| 6,577,947 B1 | 6/2003 | Kronfeld et al. | |

(Continued)

FOREIGN PATENT DOCUMENTS

| | | |
|---|---|---|
| CN | 202871010 U | 4/2013 |
| CN | 203012916 U | 6/2013 |

(Continued)

*Primary Examiner* — Daniel Previl
(74) *Attorney, Agent, or Firm* — BakerHostetler

(57) ABSTRACT

Systems and methods are described for performing logical filtering of hazard alerts by an area of geography the hazard is expected to impact and issuing alerts based on that area. Based on a geographical location, a hazard type, and a hazard severity, one or more geographic areas the hazard is expected to impact may be determined. One or more automated alerts may be issued to alert users in those areas that could be affected by the hazard.

34 Claims, 10 Drawing Sheets

(51) Int. Cl.
*H04W 4/90* (2018.01)
*H04W 76/50* (2018.01)
*H04W 4/021* (2018.01)

(58) Field of Classification Search
CPC ........... G08G 1/0962; G08G 1/096811; G08G
1/096844; G08G 1/20; G08G 5/0013;
G08G 5/0091; G08G 1/164; G08G
5/0021; G08G 3/00; G08G 5/003; G08G
5/0039; G08G 5/0052; G08G 1/0104;
G08G 5/065; G08G 1/0112; G08G
1/0133; G08G 1/0969; G08G 1/161;
G08G 1/166; G08G 1/22; G08G 5/0026;
G08G 5/0043; G08G 5/0047; G08G
5/0065; G08G 5/025; G05D 1/0214;
G05D 1/0005; G05D 1/0088; G05D
1/0212; G05D 1/0221; G05D 1/0255;
G05D 1/0257; G05D 1/0268; G05D
2201/0213; G05D 1/0206; G05D 1/0251;
G05D 1/00; G05D 1/0022; G05D 1/0027;
G05D 1/0217; G05D 1/0295; G05D
1/0653; G06N 20/00; G06N 5/04; G06N
20/10; G06N 20/20; G06N 3/006; G06N
3/088; G06N 5/003; G06N 5/02; G06N
7/005; G06N 7/023; Y10S 128/903;
B60W 2710/18; B60W 2710/20; B60W
40/10; B60W 30/0953; B60W 10/18;
B60W 10/20; B60W 2420/42; B60W
2420/52; B60W 2520/10; B60W 2554/00;
B60W 2554/4041; B60W 30/0956; B60W
2554/80; B60W 2556/65; B60W 60/0027;
C12Q 2600/158; C12Q 2600/106; C12Q
1/6883; C12Q 2600/156; C12Q 1/6886;
C12Q 2600/118; C12Q 2600/112; C12Q
2600/136; C12Q 2600/16; G01C 21/34;
G01C 23/00; G01C 11/00; G01C 11/04;
G01C 13/002; G01C 21/203; G01C
21/00; G01C 21/165; G01C 21/26; G01C
21/30; G01C 23/005; G06F 40/216; G06F
40/30; G06F 9/3853; G06F 9/3885; G06F
16/29; G06F 2111/10; G06F 2119/08;
G06F 30/00; G06F 16/2477; G06F 16/27;
G06F 16/904; G06F 16/909; G06F
16/951; G06F 16/9537; H04L 67/12;
H04L 41/0826; H04L 41/0836; H04L
41/145; H04L 45/124; H04L 1/24; H04L
41/0609; H04L 43/0864; H04L 43/10;
B63H 25/04; G01W 1/10; G01W 1/00;
G01W 2203/00; G01N 2800/26; G01N
2800/52; G01N 33/6893; G06K 9/00718;
G11B 27/031; H04N 21/2743; H04N
21/42203; H04N 21/42225; H04N
21/4223; H04N 21/43615; H04N
21/47205; H04N 21/4788; H04N 5/77;
H04N 5/772; H04N 5/91; H04N 9/8205;
H04N 9/8211; E21B 43/20; E21B
43/2401; E21B 43/16; G06Q 10/06;
G06Q 10/06313; G06Q 50/08; G06Q
10/06315; G06Q 10/0833; G06Q 10/101;
G06Q 10/103; G06Q 40/00; G06Q 40/08;
Y02A 90/10; Y02A 90/14; Y02A 90/18;
Y02A 90/26; B60K 35/00; B60R
2021/01088; B60R 2021/01231; B60R
2021/01272; B60R 21/01; B60R 21/0134;
B60R 21/23138; B60R 21/36; B60R
22/48; B64C 25/10; B64C 25/42; B64C
5/02; B64D 2045/0085; B64D 2045/0095;
B64D 45/00; B64D 45/04; B64D 45/06;
B64D 45/08; B64F 1/18; B64F 1/36;
G01S 13/765; G01S 13/878; G01S 13/95;
G01S 19/072; G01S 19/393; G01S
19/396; G01S 19/46; G01S 19/48; G01S
19/485; G01S 19/51; G01S 2205/002;
G01S 5/0036; G01S 5/0072; G01S
5/0244; G01S 5/0257; G01S 5/02695;
G01S 5/0289; G01S 5/0294; G01S 7/24;
G06T 11/203; G06T 11/206; G06T 17/05;
G16B 25/00; G16H 40/67; H04B
7/18519; Y02P 90/90; Y02T 50/80
USPC ...... 340/686.1, 601, 568.1, 564, 571, 572.1,
340/573.1, 691.3, 692, 7.51, 825.49
See application file for complete search history.

(56) References Cited

U.S. PATENT DOCUMENTS

| | | | |
|---|---|---|---|
| 6,603,405 B2 | 8/2003 | Smith | |
| 7,277,797 B1 | 10/2007 | Kunitsyn et al. | |
| 7,751,977 B2 | 7/2010 | Winkler et al. | |
| 8,204,846 B1 | 6/2012 | Crawford et al. | |
| 8,620,841 B1* | 12/2013 | Filson | H04Q 9/00 |
| | | | 706/12 |
| 2001/0028310 A1 | 10/2001 | Tuttle | |
| 2003/0182065 A1 | 9/2003 | Mandal et al. | |
| 2007/0255801 A1* | 11/2007 | Adler | H04H 20/59 |
| | | | 709/217 |
| 2009/0295587 A1 | 12/2009 | Gorman, Jr. | |
| 2010/0245095 A1 | 9/2010 | Harrell | |
| 2011/0128904 A1 | 6/2011 | Gou et al. | |
| 2013/0009780 A1* | 1/2013 | Marshall | G01W 1/10 |
| | | | 340/601 |
| 2013/0035859 A1* | 2/2013 | Guatteri | G08B 31/00 |
| | | | 702/3 |
| 2015/0138355 A1 | 5/2015 | Tillotson | |
| 2016/0210840 A1* | 7/2016 | Kirk | G08B 21/10 |
| 2017/0059744 A1* | 3/2017 | Lundy | G01D 4/002 |
| 2020/0275319 A1* | 8/2020 | Murray | H04W 36/0005 |

FOREIGN PATENT DOCUMENTS

| | | |
|---|---|---|
| CN | 107229825 A | 10/2017 |
| JP | 2003302479 A | 10/2003 |
| JP | 4510128 B1 | 7/2010 |
| JP | 2010276536 A | 12/2010 |
| WO | 2014144331 A1 | 9/2014 |

* cited by examiner

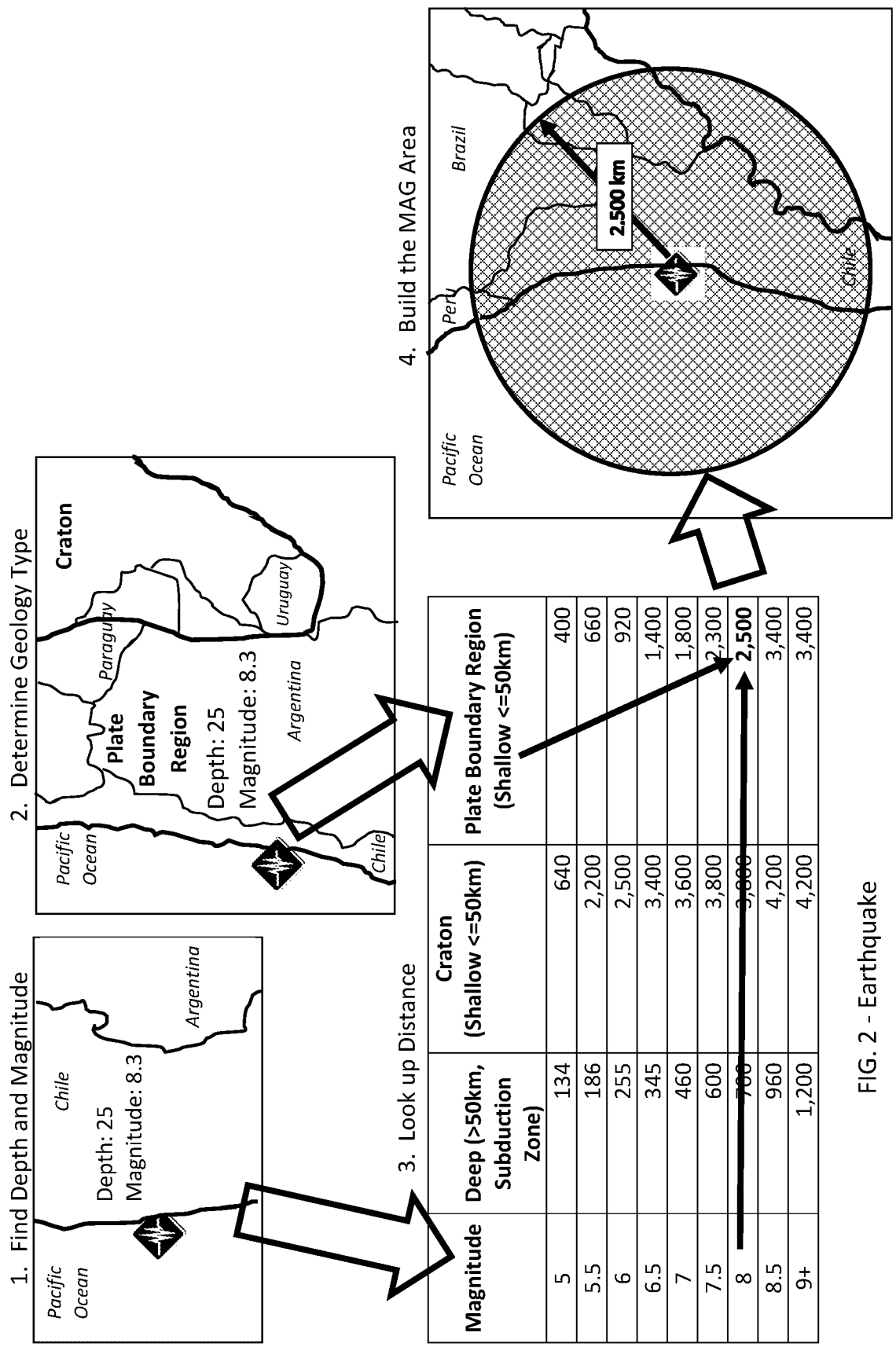
FIG. 2 - Earthquake

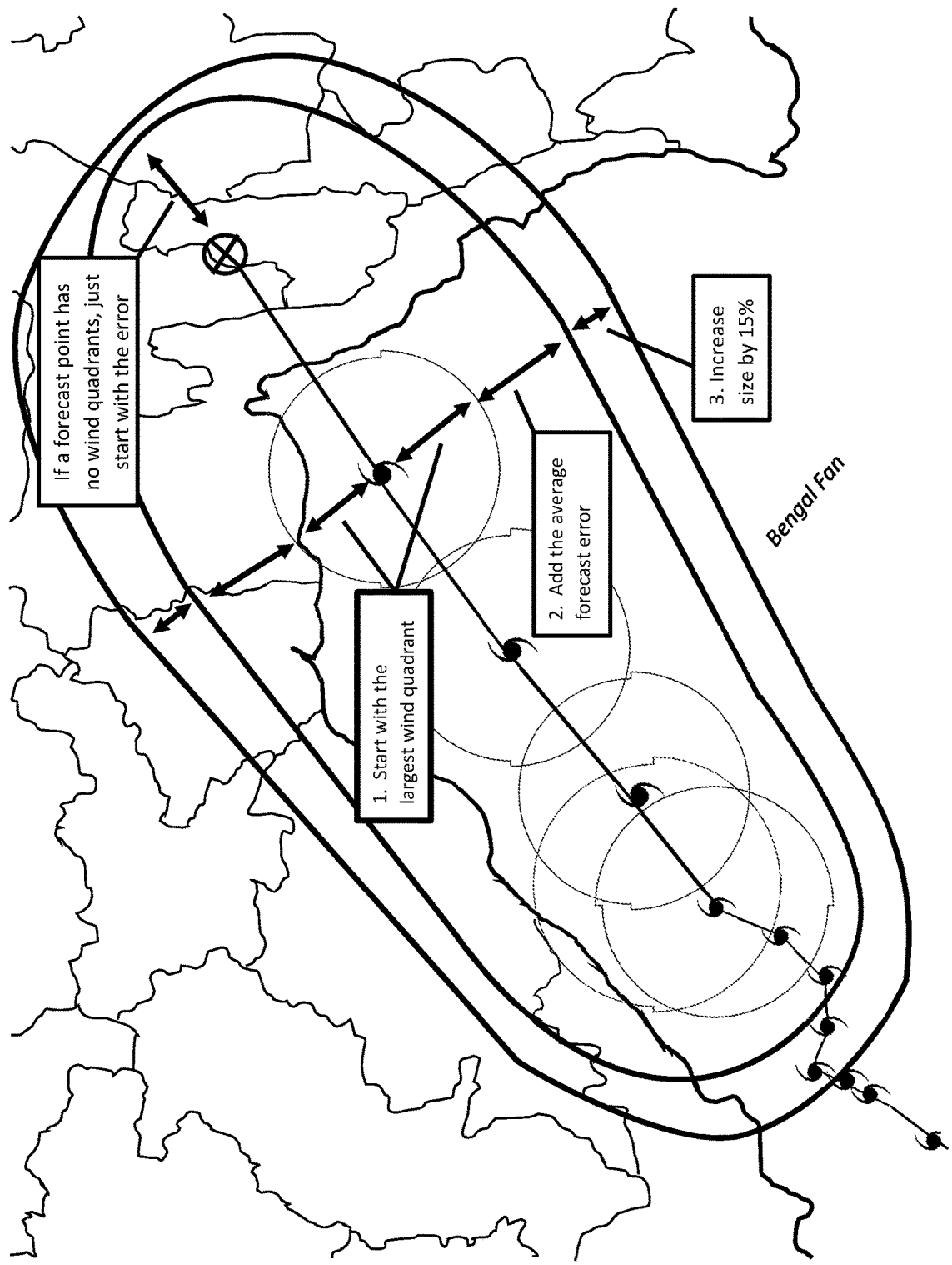
FIG. 3 – Tropical Cyclone

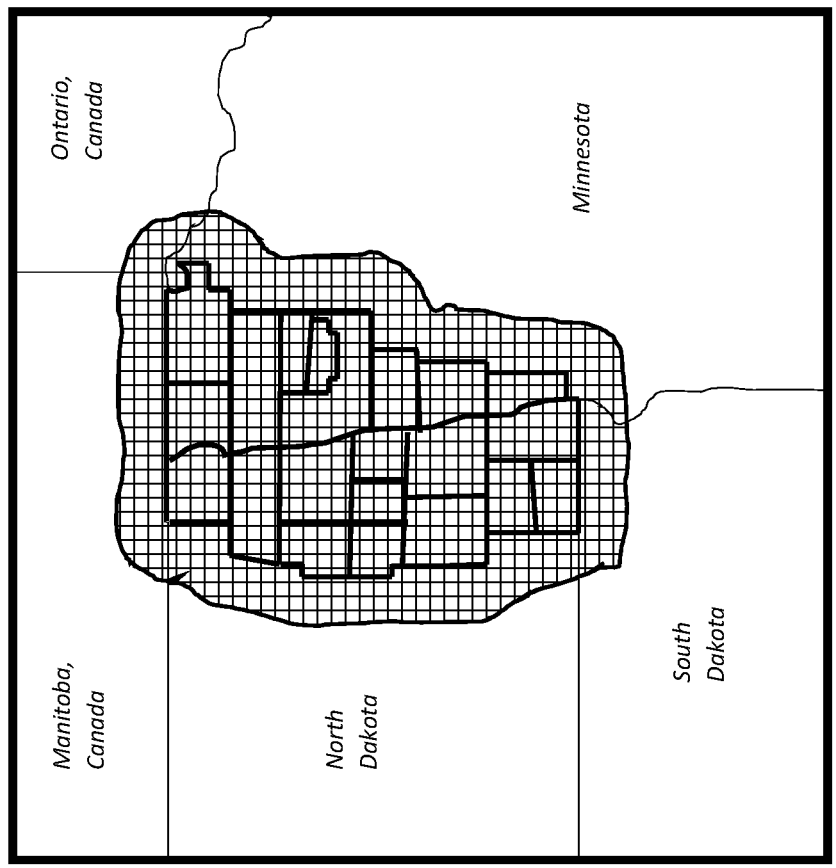
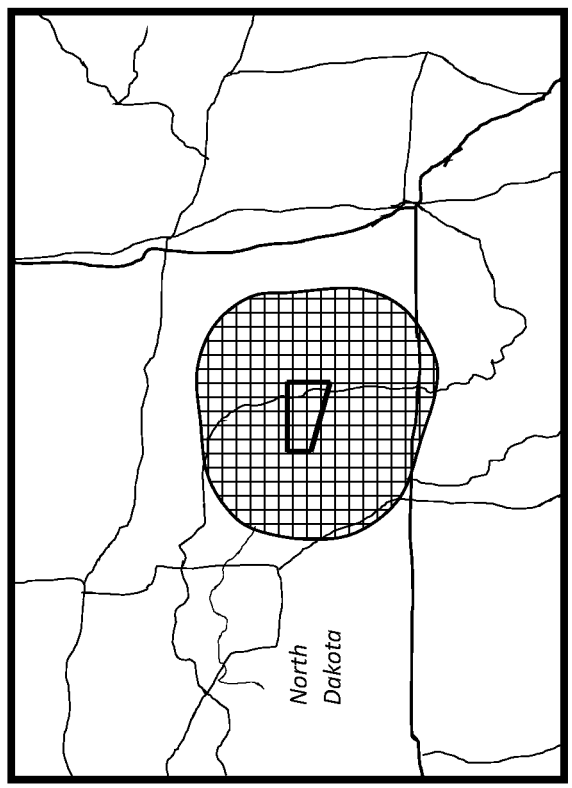
FIG. 4 - Tornado

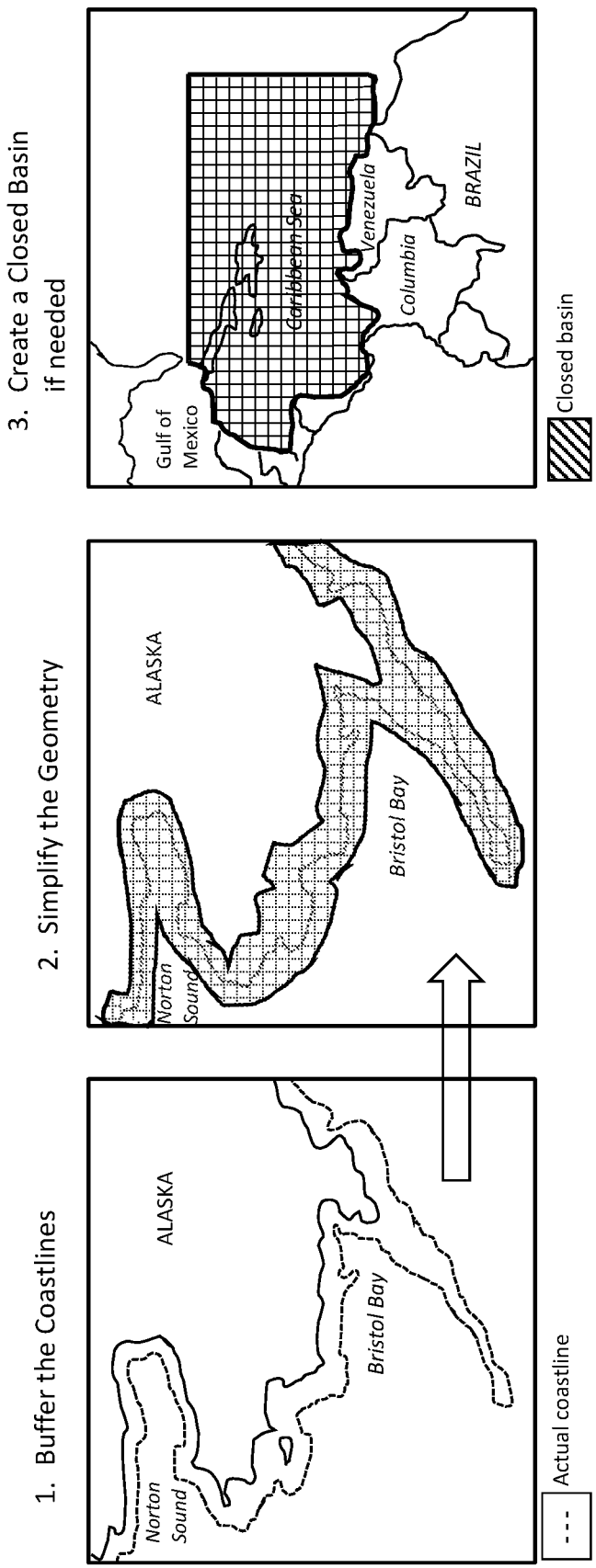
FIG. 5 - Tsunami

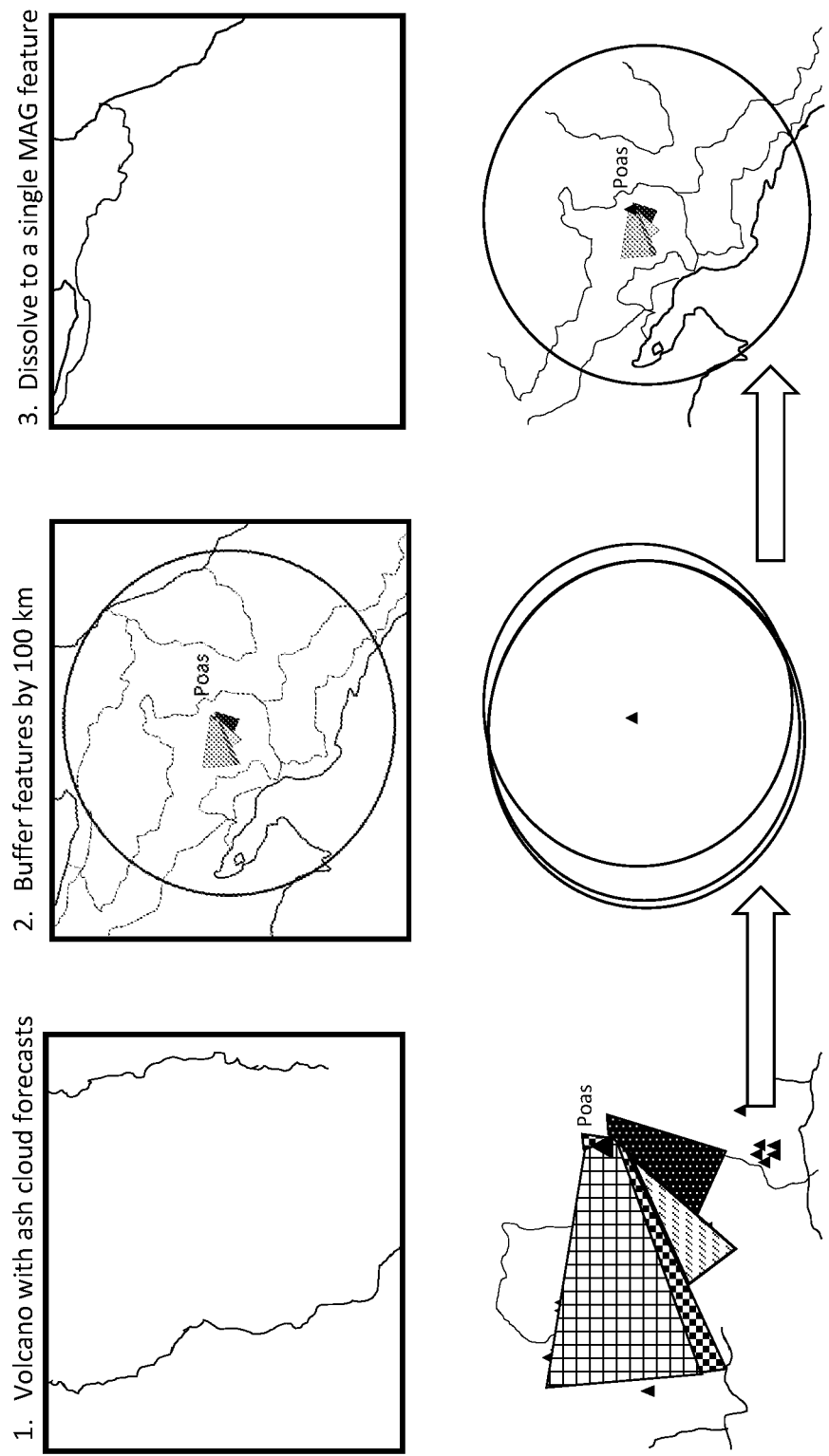
FIG. 6 – Volcanic Eruption and Volcanic Ash

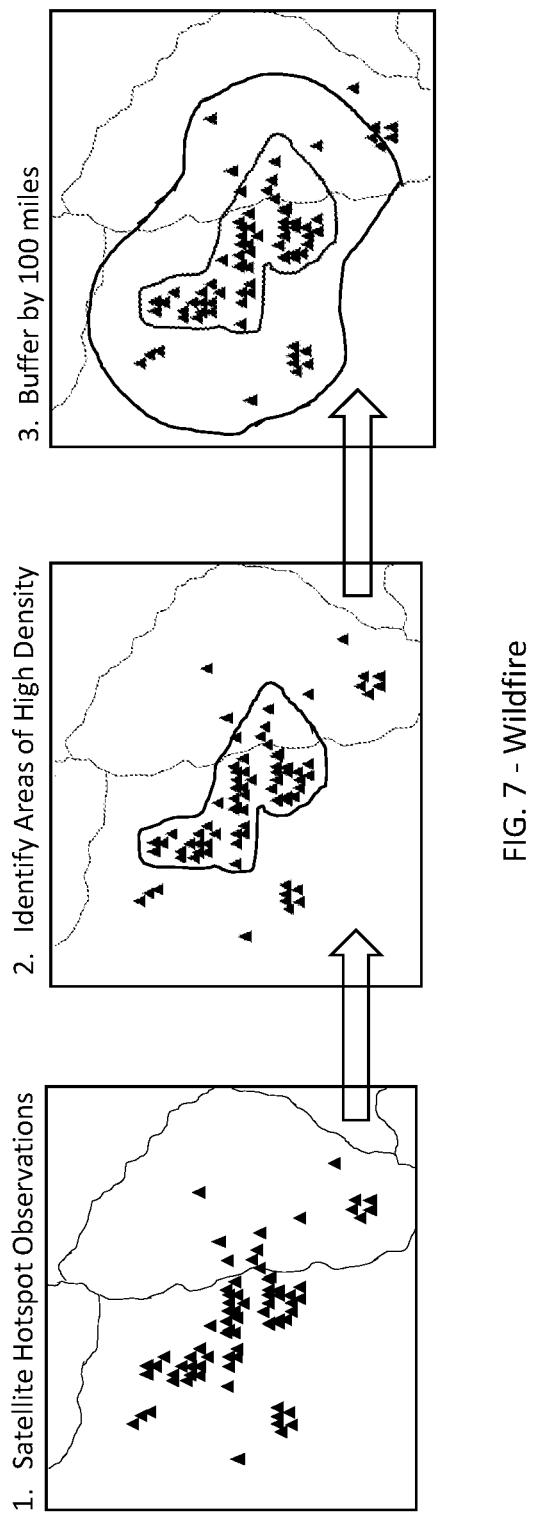
FIG. 7 - Wildfire

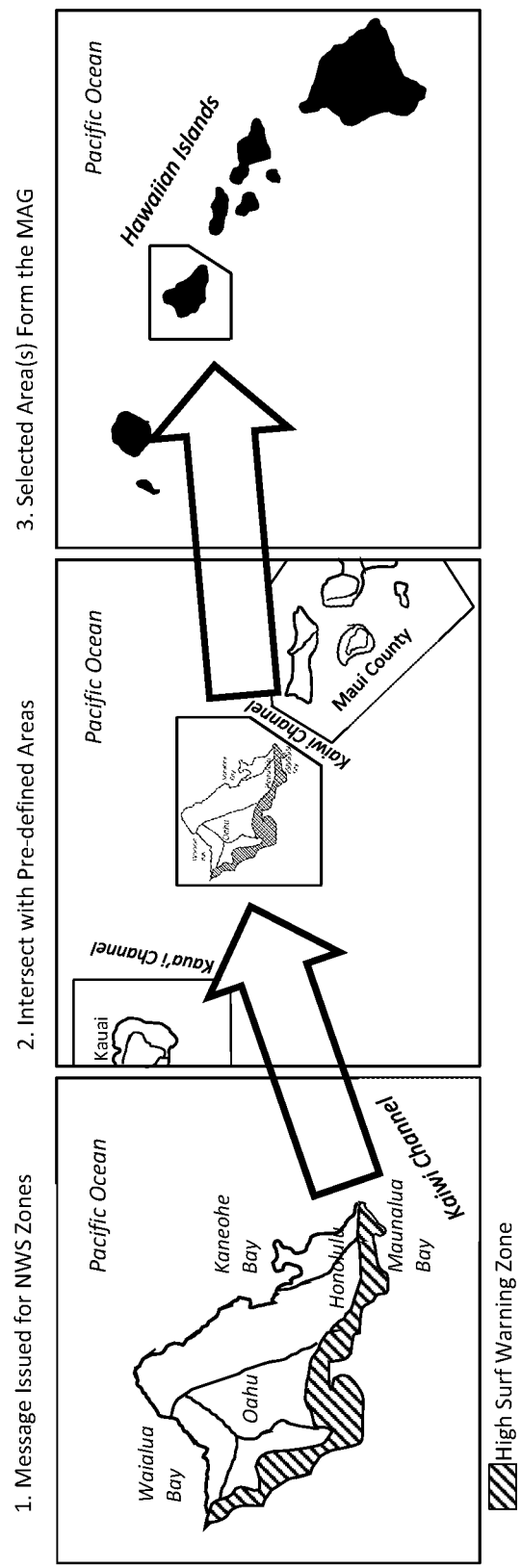
FIG. 8 - Flood, Surf, Wind

SYSTEMS AND METHODS FOR DETERMINING MAXIMUM ALERT GEOGRAPHY FOR A HAZARD

CROSS-REFERENCE TO RELATED APPLICATIONS

This application is the National Stage Application of International Patent Application No. PCT/US2019/032121 filed May 14, 2019, which claims the benefit of U.S. Provisional Application No. 62/672,254, filed on May 16, 2018, entitled "Systems and methods for determining maximum alert geography for a hazard," the content of which is hereby incorporated by reference in its entirety.

GOVERNMENT RIGHTS

This invention was made with government support under Contract No. HQ0034-16-2-0001 awarded by the Department of Defense. The government has certain rights in the invention.

BACKGROUND

Hazard observation and disaster monitoring organizations, such as the Pacific Disaster Center (PDC), monitor natural and manmade hazards around the globe. Such organizations may issue hazard alert notifications and/or disaster alert notifications to alert people within specific geographical areas of the hazard or disaster.

SUMMARY

Systems and methods are described for predicting potential area of effect of a hazard. In an example embodiment, a system may comprise one or more processors and memory coupled to at least one processor, wherein the memory comprises executable instructions that when executed by the at least one processor cause the at least one processor to effectuate operations described herein. The system may observe a hazard and determine a geographical location where the hazard is occurring. A type and severity of the hazard may also be determined. Based on the geographical location, the hazard type, and the hazard severity, one or more geographic hazard areas the hazard is expected to impact may be determined. The system may then determine one or more geographic alert areas by intersecting the one or more geographic hazard areas with one or more geographic areas of interest and then issue one or more automated alerts to one or more computer reporting systems within the one or more geographic alert areas. The one or more automated alerts may be issued within a predetermined time after observing the hazard. In example embodiments, the predetermined time may be real time or near real time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The following drawings show generally, by way of example, but not by way of limitation, various examples discussed in the present disclosure.

FIG. 2 illustrates an example of maximum alert geography (MAG) system processing when the system determines it has received an earthquake hazard.

FIG. 3 illustrates an example of MAG system processing when the system determines it has received a tropical cyclone hazard.

FIG. 4 illustrates an example of MAG system processing when the system determines it has received a tornado hazard.

FIG. 5 illustrates an example of MAG system processing when the system determines it has received a tsunami hazard.

FIG. 6 illustrates an example of MAG system processing when the system determines it has received a volcanic eruption hazard.

FIG. 7 illustrates an example of MAG system processing when the system determines it has received a wildfire hazard.

FIG. 8 illustrates an example of MAG system processing when the system determines it has received a flood, high surf, and/or high wind hazard.

DETAILED DESCRIPTION

Figure 1:
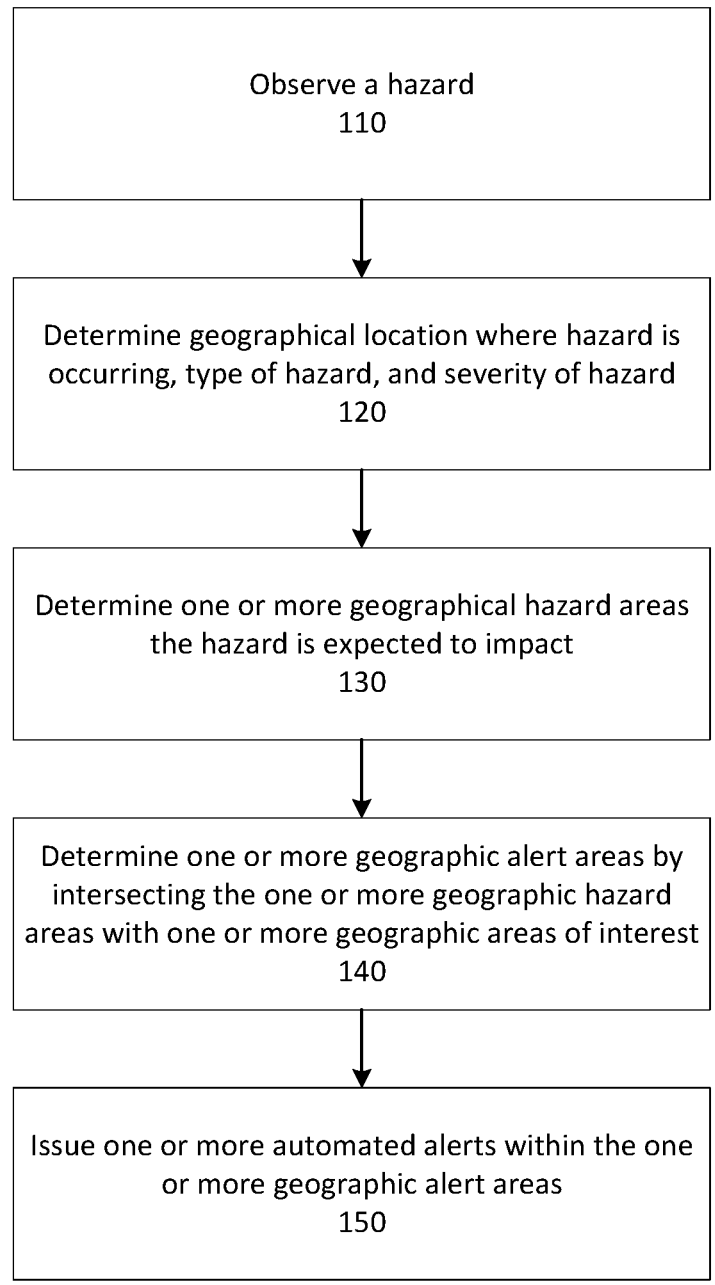
FIG. 1 is a flow diagram depicting an example method for predicting potential area of effect of a hazard.

Hazard observation and disaster monitoring organizations, such as the Pacific Disaster Center (PDC), monitor natural and manmade hazards around the globe. Such organizations may use alert systems to issue hazard alert notifications and/or disaster alert notifications (collectively "alerts") to users within specific geographical areas impacted by the hazard or disaster. However, because many hazards may have distant impacts (e.g., an earthquake epicenter that triggers a tsunami), users define areas of interest that are very large, if not global. As a result, the volume of notifications increases tremendously as hazard observation organizations add frequently occurring hazards to their alert systems. Such volume decreases the effectiveness of each alert received by users, increases strain and bandwidth use by computer networks transmitting such alerts, and increases strain and reduces efficiency of computer systems processing such alerts. Selecting smaller areas of interest may overcompensate for these problems and result in missed alerts that may be relevant and potentially dangerous. Thus, there is a need for logical filtering of alerts to better determine which alerts have the most utility, to increase efficiency and relevance of alerts to the consumers, and to reduce strain on computer networks and systems transmitting and processing such alerts.

Systems and methods are described for performing logical filtering of hazard alerts by an area of geography the hazard is expected to impact. Such systems and methods may be referred to as "maximum alert geography (MAG) systems." The MAG systems may predict potential area of effect of a hazard. In an example embodiment, a system may comprise one or more processors and memory coupled to at least one processor, wherein the memory comprises executable instructions that when executed by the at least one processor cause the at least one processor to effectuate operations described herein. The system may observe a hazard and determine a geographical location where the hazard is occurring. A type and severity of the hazard may also be determined. Based on the geographical location, the hazard type, and the hazard severity, one or more geographic hazard areas the hazard is expected to impact may be determined. The system may then determine one or more geographic alert areas by intersecting the one or more geographic hazard areas with one or more geographic areas of interest and then issue one or more automated alerts to one or more computer reporting systems within the one or more geographic alert areas. The one or more automated alerts may be issued within a predetermined time after observing the hazard. In example embodiments, the predetermined time may be real time or near real time.

A hazard may comprise one or more natural or manmade events that may be dangerous to users or property. Examples of hazards may comprise one or more of the following: an earthquake; a tropical cyclone; a tornado; a tsunami; a volcanic eruption; a wildfire; flooding; excess rain; a storm; a winter storm; a landslide; an avalanche; a mudflow; an extreme temperature; a drought; a marine event; a biohazard; an explosion; a bombing; a terrorist attack; and an active shooter.

MAG systems may define a geographical area surrounding a hazard's location that is likely to be impacted by the hazard. This geographical area may then be used to identify users that should be alerted to the hazard. For example, a user may be interested, via active means such as selection and/or passive means such as location, in alerts for hazards on the West Coast of the United States. The user may receive alerts for the West Coast, but may also receive alerts for a distant hazard that may impact the West Coast, such as a tsunami.

FIG. 1 is a flow diagram depicting an example method for predicting potential area of effect of a hazard. Although FIG. 1 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 1 may occur via the use of one or more processors in one or more computing entities.

At block 110, a hazard may be observed. A hazard may be observed via any suitable method. In some embodiments, hazard data may be received from one or more notification sources. For example, sensor and weather warning data may be received from a weather service or other hazard monitoring organization. In some embodiments, a hazard may be user-defined. For example, a user may define that a contamination biohazard has occurred.

At block 120, a geographical location, type, and severity of the observed hazard may be determined. Such attributes may be received from one or more notification sources or may be user-defined. Location, type, severity, or any combination thereof, may be parsed from received data. Alternatively or additionally, a user may define one or more of these attributes. Determination of location, type, and severity may occur in any order, and one or more of these attributes may be based on another. For example, a severity may be based on the data received and the type of the hazard, such as when severity is measured on a scale specific to the type of hazard. In an embodiment where wind speed data is received, severity may be based on the type of hazard, e.g., tropical cyclones may use the Saffir-Simpson scale while tornadoes may use the Fujita, or "F," scale.

At block 130, one or more geographical hazard areas the hazard is expected to impact may be determined. Such hazard areas may comprise land, water, or a combination thereof. Determining such hazard areas may be performed differently based on the type of hazard. Processes are described below for different examples of hazards. Alternatively or additionally, the one or more geographical hazard areas may be user-defined.

At block 140, one or more geographic alert areas may be determined. A geographic alert area may be an area an alert should be issued to. In some embodiments, such areas may be determined by intersecting the one or more geographic hazard areas with one or more geographic areas of interest. A geographic area of interest may be a geographic area where alerts may be issued or an area that has been selected by a user to be of interest. Such geographic areas of interest may include geographic areas with large concentrations of human population, geographic areas that are monitored by computer reporting systems, geographic areas within a predetermined radius of a cell tower, geographic areas within a predetermined radius or circumference of other assets (e.g., buildings, parks, storefronts, or any other defined asset or location), and geographic areas within one or more geofences, among others. A geographic area of interest may also be user-defined.

At block 150, one or more automated alerts may be issued to the one or more geographic alert areas. Such automated alerts may be of any suitable form and may be sent to one or more computer systems for distribution or reception. For example, automated alerts may be sent to mobile devices. Automated alerts may also be sent via a Common Alerting Protocol (CAP) or other standard protocol used by disaster alert systems.

Time may be an important factor in avoiding or preparing for dangerous and/or life-threatening hazards. Systems for alerting users of such danger should be as fast as possible. The processes described with respect to FIG. 1 may be implemented in real time or near real time of observing a hazard. Recalculating new hazard impact and alert areas after receiving updated data regarding a hazard may also be performed in real time or near real time. Such fast processing ensures that users may be constantly receiving the latest updates regarding hazards in their area.

FIG. 2 illustrates an example of MAG system processing when the system determines it has received an earthquake hazard. A MAG system may proceed to determining the one or more geographic hazard areas the hazard is expected to impact, corresponding to block 130 of FIG. 1. The system may determine an epicenter of the earthquake, a depth of the earthquake, and a magnitude of the earthquake. Such information may be determined from the received data in a manner similar to how the type and severity of the hazard may be determined. Based on the epicenter, the depth, and the magnitude, the MAG system may determine a geographical radius surrounding the epicenter. Area encompassed by this geographical radius may now be considered the one or more geographic hazard areas the earthquake is expected to impact. The geographical radius may be determined via a series of calculations. First, the system may calculate a decay of energy corresponding to distance extending outwardly from the epicenter based on one or more attenuation functions. Then, based on the decay of energy, a maximum distance from the epicenter subject to effects of the earthquake may be calculated. The geographic radius may then be calculated based on this maximum distance from the epicenter. The one or more attenuation functions may be selected based on the magnitude, the depth, a location of the epicenter on a tectonic plate, or any combination thereof. Such attenuation function values may be stored in a table for lookup, such as that shown in FIG. 2 or that shown below in Table 1.

TABLE 1

Example Earthquake Attenuation Function Values

| Earthquake Alert Threshold Distances (km) | Advisory (M 5-5.5) | Watch (M 5.5-6.5) | Warning (M >= 6.5) |
|---|---|---|---|
| Shallow (<=12 km) | 2,200 | 3,400 | 4,200 |
| Medium (>12-50 km) | 700 | 2,100 | 3,400 |
| Deep (>50 km) | 200 | 350 | 1,000 |

An earthquake may also produce a tsunami under certain conditions. Such conditions may be determined and/or triggered based on additionally processing, such as that described below with respect to FIG. 5.

FIG. 3 illustrates an example of MAG system processing when the system determines it has received a tropical cyclone hazard. A MAG system may proceed to determining the one or more geographic hazard areas the hazard is expected to impact, corresponding to block 130 of FIG. 1. The system may determine a forecast point of a forecast path of the typical cyclone. The forecast point and forecast path may be determined by the system based on available data or received by the system from one or more weather monitoring services or organizations. The system may determine a plurality of distance measurements of gale-force winds extending outwardly in at least four directions from the forecast point, and determine a largest distance measurement of the plurality of distance measurements. The plurality of distance measurements may extend outwardly in any four directions suitable for calculating a buffer around the tropical cyclone. For example, the plurality of distance measurements may extend outwardly in the northeast, southeast, southwest, and northwest directions. The system may then determine an average error measurement based on historical data associated with tropical cyclones. The average error may be based on any suitable amount of data. In an embodiment, the error may be based on the previous five years of data. The system may then combine the largest distance measurement and the average error measurement to generate a geographic radius surrounding the forecast point. An additional percentage radius may also be added to the calculated geographic radius as a precaution and to account for error. Such an additional radius is shown as step 3 in FIG. 3.

FIG. 4 illustrates an example of MAG system processing when the system determines it has received a tornado hazard. A MAG system may proceed to determining the one or more geographic hazard areas the hazard is expected to impact, corresponding to block 130 of FIG. 1. The system may determine one or more geographical areas alerted by tornado watches, alerted by tornado warnings, or alerted by both tornado watches and tornado warnings. Such watch and warning data may be received from one or more weather monitoring services or organizations. The system may determine a separate geographical area encompassing the one or more geographical areas. This may create a single geographic area that the system may then buffer with a predetermined distance extending outwardly from the geographical area. In the example shown in FIG. 4, the single geographic area is buffered by 80 miles, though any buffer amount may suffice.

FIG. 5 illustrates an example of MAG system processing when the system determines it has received a tsunami hazard. The MAG system may proceed to determining the one or more geographic hazard areas the hazard is expected to impact, corresponding to block 130 of FIG. 1. The system may determine an ocean basin in which the tsunami occurred. The ocean basin may be determined based on the received location of the tsunami. The system may then determine a geographical area encompassing the ocean basin and buffer the geographical area with a predetermined distance extending inland. In the example shown in FIG. 5, the system performs the optional steps of simplifying the geometry of the buffered geographical area encompassing the ocean basin and creating a closed basin. Simplifying the geometry and creating a closed basin may allow the system to more efficiently process the hazard by limiting processing power used on size and shape of the area.

FIG. 6 illustrates an example of MAG system processing when the system determines it has received a volcanic eruption hazard. The MAG system may proceed to determining the one or more geographic hazard areas the hazard is expected to impact, corresponding to block 130 of FIG. 1. The system may determine zero or more observed ash clouds associated with the volcanic eruption. Such data may be received from one or more weather monitoring services or organizations. The system may also determine one or more forecast ash clouds associated with the volcanic eruption. Forecast ash clouds may be those likely to form based on historical data associated with this volcano or other similar volcanoes. Forecast ash clouds may also be based on wind and other weather that may affect movement, size, and/or shape of the ash clouds. The system may determine a geographical area surrounding each ash cloud and buffer the geographical area with a predetermined distance extending outwardly from the geographical area. In the example shown in FIG. 6, a geographical area surrounding each ash cloud is buffered by 100 km, though any suitable buffer amount may be used. The geographical areas are then combined into a single area to issue alerts to. If the determine geographical area surrounds is determined such that it encompasses multiple ash clouds, then this combining step may be unnecessary.

FIG. 7 illustrates an example of MAG system processing when the system determines it has received a wildfire hazard. The MAG system may proceed to determining the one or more geographic hazard areas the hazard is expected to impact, corresponding to block 130 of FIG. 1. The system may determine one or more affected geographical areas of the wildfire. Such data regarding affected areas may be received from one or more weather monitoring services or organizations. The system may then buffer the affected geographical area with a predetermined distance extending outwardly from the geographical area. The system may also combine affected areas into a single affected area before buffering. In the example shown in FIG. 7, the affected geographical areas are buffered by 100 miles, though any suitable buffer amount may be used. The system may also track a path of the wildfire over one or more days to determine one or more additional geographical areas encompassing the path of the wildfire. The system may extend the one or more affected areas by the additional geographical area and buffer the extended one or more hazard areas by the predetermined distance. Multiple days of data may be saved and merged to determined geographical areas affected by the wildfire.

FIG. 8 illustrates an example of MAG system processing when the system determines it has received a flood, high surf, and/or high wind hazard. The MAG system may proceed to determining the one or more geographic hazard areas the hazard is expected to impact, corresponding to block 130 of FIG. 1. The system may determine geographical areas affected by the flood, high surf, and/or high wind and predetermined boundaries corresponding to those geographical areas. Predetermined boundaries may include one or more of a predetermined zone, a county boundary, a polygon specified by latitude/longitude coordinate pairs, or any combination thereof. The geographic hazard areas may be determined by combining the predetermined boundaries into a single geographical area. As shown in FIG. 8, the pre-defined area of step 2 encompasses the boundaries shown in step 1. Thus, the single geographic area shown in step 3 is the pre-defined area.

As described above, hazards, or attributes of hazards, may also be user-defined. A user may use a user interface to interact with a MAG system and create hazards that alerts should be issued for. A user interface may be any suitable interface for allowing the user to interact with the system. Examples of user interfaces include graphical user interfaces (GUIs) and command-line interfaces. A user may create the location, type, and/or severity of a hazard. The user may also update attributes of a hazard being processed by the MAG system. For example, the user may change a location of a hazard to a location that is more densely populated. Additionally, the user may specify a calculation for geographic hazard areas. Such a calculation may include a mathematical equation, a buffer amount, or any other feasible manner of indicating a geographic area. Additionally or alternatively, a user may also draw the geographic hazard areas.

Multiple hazards may be handled simultaneously to provide alerts to some or all affected geographic areas. The processes described with respect to FIG. 1 may be performed in parallel to ensure affected geographic areas are issued alerts as soon as possible.

Multiple hazards may also be combined into a composite hazard to properly provide alerts to impacted users. For example, one or more hazard alerts may be received. Based on the one or more hazard alerts, one or more geographical warning areas may be determined and combined into a single hazard area. The system may then generate the composite hazard at a location within the single hazard area. The location of the composite hazard may be placed at a centroid of the single hazard area, calculated based on the size and shape of the hazard area. The location of the composite hazard may alternatively be placed at a location of strongest severity of the single hazard area, or any other area suited to possible affected areas. The type(s) and severity of the composite hazard may be determined, combined, and/or calculated based on the one or more received alerts.

Determining geographic hazard areas that a hazard is expected to impact may include forecasting the hazard into the future for minutes, hours, days, weeks, etc. Determining such a hazard area may comprise estimating a future path of the hazard and then determining one or more geographic areas surrounding that future path. For example, as a storm moves location over time, geographic areas surrounding that moving location may be impacted by the storm and thus should be included in the hazard areas to be impacted by the storm. Determining a geographic hazard area may also include determining a possible duration of the hazard and then determining one or more geographic areas affected by the hazard based on future conditions of the hazard during the possible duration. For example, the longer a wildfire burns, the more smoke and debris may be added to the air. Areas around such a wildfire may not initially be affected by the wildfire, but may be affected by the smoke and debris several days later and should therefore be included in the hazard areas to be impacted by the wildfire.

Additional geographical areas a hazard may impact may also be determined for the issuance of alerts. Users may be impacted by a hazard even though the hazard was not present in the users' vicinity. For example, snowfall from a winter storm may disrupt electric power to more residents than those affected by the snowfall. Additional data may be received, parsed, and/or interpreted to determine such impact areas. Impact areas may be added to the one or more geographic alert areas so that users within those areas may also be issued alerts.

Figure 9:
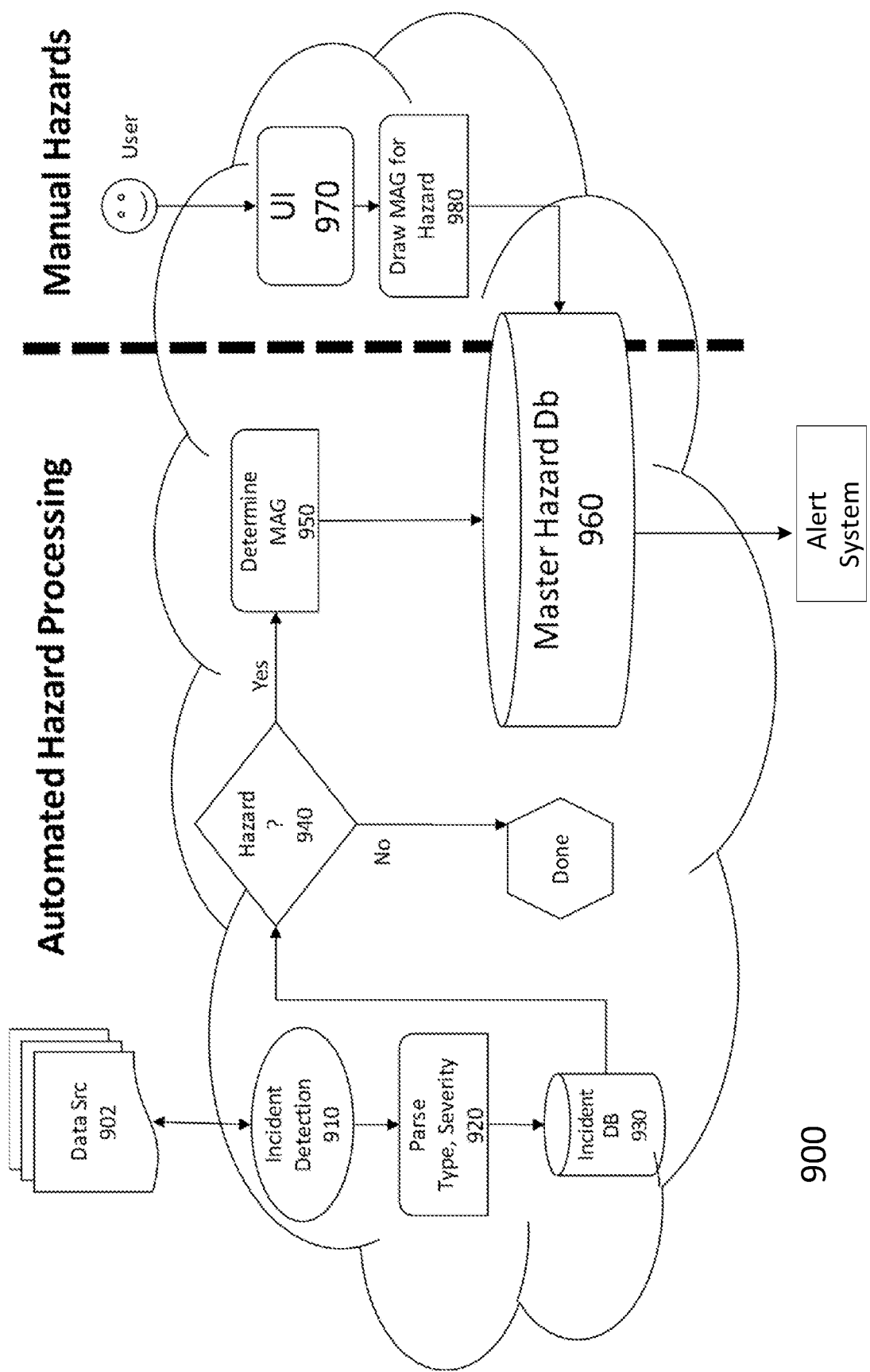
FIG. 9 is a block diagram of an example system for predicting a potential area of effect of a hazard.

FIG. 9 is a block diagram of an example system 900 for predicting a potential area of effect of a hazard. The system 900 may be part of a cloud system, as depicted in FIG. 9, or any suitable type of system comprising one or more processors and memory coupled to at least one processor, wherein the memory comprises executable instructions that when executed by the at least one processor cause the at least one processor to effectuate operations described herein, such as those with respect to FIG. 1. The components shown in FIG. 9 may represent physical components or software components and may be referred to as "modules." Such modules may reside on one or more systems or computer programs or may be part of a single system or computer program. The modules and processes are depicted for illustrative purposes only and should not be construed as limiting.

The incident detection module 910 may receive data from one or more data sources 902 and may determine that an incident may be occurring. An incident may be a data outlier or other data deviation in weather data or other alert data. The parser module 920 may parse the type and severity of the incident based on the received data. The parser module 920 may then send the type and severity to an incident database 930. The incident database 930 may be used to store incident data. Storage of incident data may be used for comparing incident data over time and for forecasting the incident. The incident database 930 may send the incident data to a hazard decision module 940. The hazard decision module 940 may determine, based on the location, type, and severity of the incident, whether the incident is a hazard. If the incident is not a hazard, the process stops. If the incident is a hazard, the Determine MAG module 950 may determine one or more geographic alert areas, such as in the processes describe above in blocks 130 and 140 of FIG. 1. The geographic alert areas may then be sent to a master hazard database 960 for storage. Storage of new data in the master hazard database 960 may trigger the issuance of alerts to the stored geographic alert areas. Data stored in the master hazard database 960 may be used to analyze the hazard and store the hazard's data for future comparisons and forecasting.

The UI module 970 may be a user interface. The UI module 970 may be any user interface suitable for interacting with the system 900, including for entering hazard data as described above. The UI module 970 may also be used to manually alter any of the hazard calculations made by the system. Such alterations may be useful, for example, if a user has more information than that provided to the system and/or if a hazard deviates from its forecast. The UI module 970 may be displayed on any suitable display in communicating with the system 900, such as those described below with respect to computing device 1000. The drawing module 980 may allow a user to draw one or more geographical areas for one or more hazards so that alerts may be issued in those areas. The drawing module 980 may be used via the UI module 970.

Figure 10:
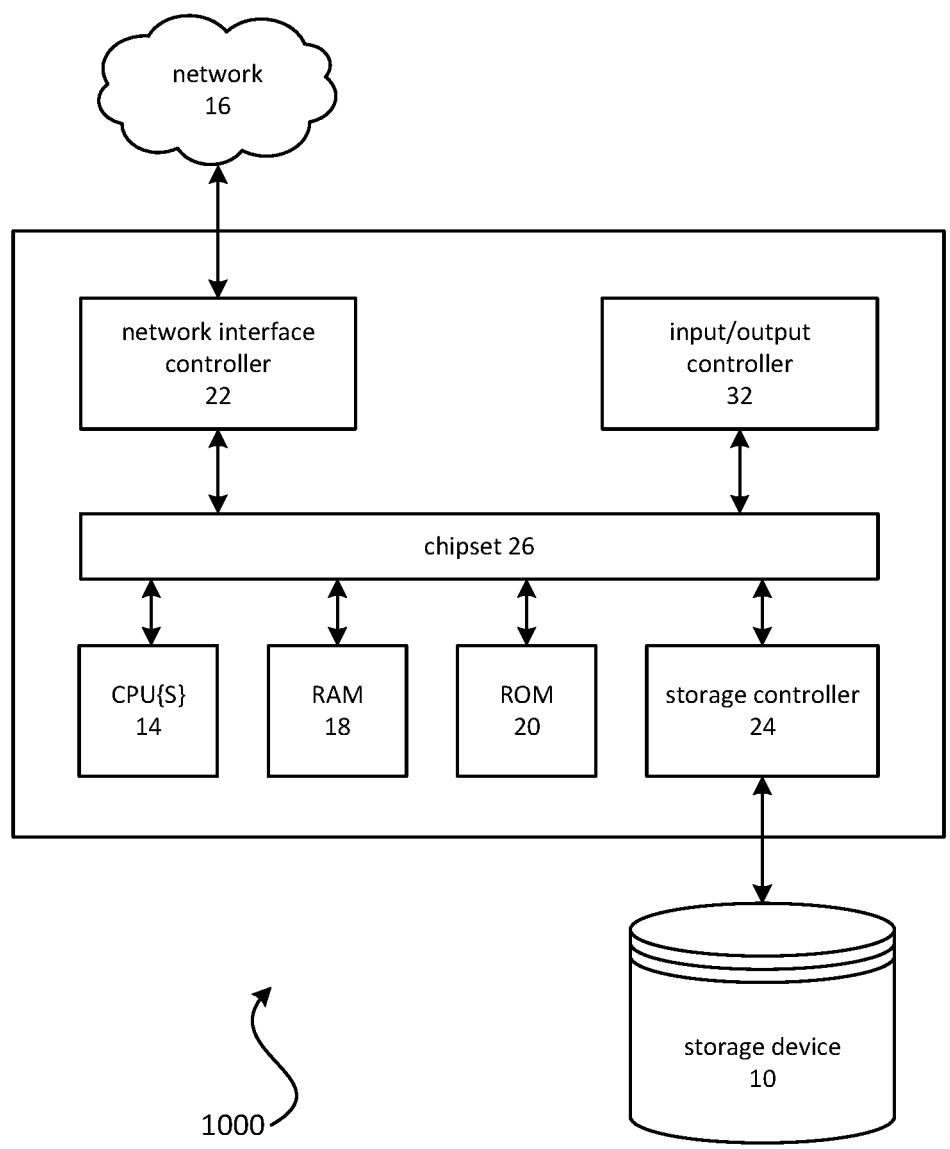
FIG. 10 illustrates an example computing device that may be used in various system components, such as any of those described and/or depicted with regard to FIGS. 1-9.

FIG. 10 illustrates an example computing device that may be used in various system components, such as any of those described and/or depicted with regard to FIGS. 1-9. The computer architecture shown in FIG. 10 may correspond to a desktop computer, laptop, tablet, network appliance, e-reader, smartphone, or other computing device, and may be utilized to execute any aspects of the computers described herein, such as to implement the operating procedures of FIGS. 1-9.

A computing device 1000 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 1000.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 1000. The chipset 26 may further provide an interface to a computer-readable storage medium, such as a read-only memory ("ROM") 20 or non-volatile RAM ("NVRAM") (not shown), for storing basic routines that may help to start up the computing device 1000 and to transfer information between the various components and devices. The ROM 20 or NVRAM may also store other software components necessary for the operation of the computing device 1000 in accordance with the aspects described herein.

The computing device 1000 may operate in a networked environment using logical connections to remote computing nodes and computer systems through a local/wide area network ("LAN/WAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 1000, connecting the computing device to other types of networks and remote computer systems.

The computing device 1000 may be connected to a mass storage device 10 that provides non-volatile storage for the computing device 1000. The mass storage device 10 may store system programs, application programs, other program modules, and data, used to implement the processes and systems described in greater detail herein. The mass storage device 10 may be connected to computing device 1000 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1000 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 1000 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 10 by detecting the physical states or characteristics of one or more particular locations within the physical storage units.

In addition to the mass storage device 10 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 1000. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 1000.

The mass storage device 10 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 14 transition between states, as described above. The computing device 1000 may have access to computer-readable storage media storing computer-executable instructions, which, when executed by the computing device 1000, may perform operating procedures depicted in FIGS. 1-9.

The computing device 1000 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing node may be a physical computing device, such as the computing device 1000 of FIG. 10. A computing node may also include a virtual machine host process and one or more virtual machine instances operating on a physical computing device, such as the computing device 1000. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A system comprising a computing device arranged to perform operations comprising:
    observing a plurality of hazards of different types, the types comprising cyclone, tornado, volcanic eruption, earthquake, and wildfire;
    for each hazard, determining a geographic location where the hazard is occurring, a type of the hazard, and a severity of the hazard;
    for each hazard, determining, based on the geographic location, the type, and the severity of the hazard, one or more geographic hazard impact areas;
    for each hazard, determining, based on intersections of the geographic hazard impact areas with portions of one or more geographic areas of interest, a maximum alert geography (MAG) for the hazard, the MAG encompassing at least the geographic areas of interest, wherein the MAG extends beyond the geographic hazard impact areas; and
    for each hazard, issuing one or more automated alerts to one or more computer reporting systems within the MAG of the hazard , wherein the one or more automated alerts are issued within a predetermined time after observing the hazard.

2. The system of claim 1, wherein determining the geographic hazard impact areas comprises:
    estimating a future path of a hazard; and
    determining one or more geographic areas surrounding the future path.

3. The system of claim 1, wherein determining the geographic hazard impact areas comprises:
    determining a possible duration of a hazard; and
    determining one or more geographic areas based on future conditions of the hazard during the possible duration.

4. The system of claim 1, wherein the computer reporting systems comprise mobile devices.

5. The system of claim 1, wherein the determining the geographic hazard impact areas comprises:
    determining an epicenter of an earthquake;
    determining a depth of the earthquake;
    determining a magnitude of the earthquake; and
    determining, based on the epicenter and the depth and the magnitude, a geographic radius surrounding the epicenter.

6. The system of claim 5, wherein determining the geographic radius comprises:
    calculating, based on one or more attenuation functions, a decay of energy corresponding to distance extending outwardly from the epicenter;

calculating, based on the decay of energy, a maximum distance from the epicenter subject to effects of the earthquake; and calculating the geographic radius based on the maximum distance.

7. The system of claim 6, wherein one or more of the attenuation functions is selected based on at least one of: the depth; and a location of the epicenter on a tectonic plate.

8. The system of claim 1, wherein determining the geographic hazard impact areas comprises:

determining a forecast point of a forecast path of a cyclone;

determining a plurality of distance measurements of gale-force winds extending outwardly in at least four directions from the forecast point;

determining a largest distance measurement of the plurality of distance measurements;

determining, based on historical data, an average error measurement; and combining the largest distance measurement and the average error measurement to generate a geographic radius surrounding the forecast point.

9. The system of claim 8, wherein the plurality of distance measurements extend outwardly in the northeast, southeast, southwest, and northwest directions.

10. The system of claim 8, further comprising adding an additional percentage radius to the generated geographic radius.

11. The system of claim 1, wherein determining the geographic hazard impact areas comprises:

determining a tornado alert area, the tornado alert area comprising one or more geographic areas alerted by tornado watches and/or tornado warnings; and buffering the separate geographic area with a predetermined distance extending outwardly from the separate geographic area.

12. The system of claim 1, wherein determining one or more geographic hazard impact areas comprises:

determining an ocean basin in which a tsunami occurred;

determining a geographic area encompassing the ocean basin; and buffering the geographic area with a predetermined distance extending inland.

13. The system of claim 1, wherein determining one or more geographic hazard impact areas comprises:

determining an observed ash clouds associated with a volcanic eruption;

determining a forecast ash cloud associated with the volcanic eruption;

determining a geographic area surrounding each ash cloud; and buffering the geographic area with a predetermined distance extending outwardly from the geographic area.

14. The system of claim 1, wherein the hazards comprise a wildfire, and wherein the determining one or more geographic hazard impact areas comprises:

determining an affected geographic area of the wildfire;

buffering the affected geographic area with a predetermined distance extending outwardly from the geographic area.

15. The system of claim 14, further comprising:

tracking a path of the wildfire over one or more days;

determining an additional geographic area encompassing the path;

extending the one or more geographic hazard impact areas by the additional geographic area; and buffering the extended one or more geographic hazard impact areas by the predetermined distance.

16. The system of claim 1, wherein one or more alerts comprises a Common Alerting Protocol message.

17. The system of claim 1, wherein the predetermined time comprises real time or near real time.

18. The system of claim 1, wherein the operations further comprise recalculating, in real time or near real time after receipt of a hazard update, a geographic hazard impact area and a MAG.

19. The system of claim 1, wherein the geographic areas of interest comprise a geographic area with a large concentration of human population.

20. The system of claim 1, wherein the geographic areas of interest comprise a geographic area that is monitored by computer reporting systems.

21. The system of claim 1, wherein the geographic areas of interest comprise a geographic area within a predetermined radius of a cell tower.

22. The system of claim 1, wherein the geographic areas of interest comprise a geographic area within a geo-fence.

23. The system of claim 1, wherein a geographic areas of interest comprise a user-defined geographic area.

24. The system of claim 1, wherein the hazards comprise a user-defined hazard.

25. The system of claim 24, wherein the user-defined hazard is created via a user interface.

26. The system of claim 1, wherein a geographic location of a first hazard is user-defined.

27. The system of claim 26, wherein the geographic location of the first hazard is created via a user interface.

28. The system of claim 1, wherein a first geographic hazard impact areas is user-defined.

29. The system of claim 28, wherein geographic hazard impact areas are created via a user interface.

30. The system of claim 1, wherein observing the plurality of hazards comprises:

receiving one or more hazard alerts;

determining, based on the one or more hazard alerts, one or more geographic warning areas;

combining the one or more geographic warning areas into a single hazard area; and generating a composite hazard at a location within the single hazard area, wherein the type and severity of the composite hazard are determined based on the one or more alerts.

31. The system of claim 30, wherein a geographic location of the composite hazard is placed at a centroid of the single hazard area.

32. The system of claim 30, wherein a geographic location of the composite hazard is placed at a location of strongest severity of the single hazard area.

33. The system of claim 1, wherein a first hazard comprises a combination of a second hazard and a third hazard.

34. The system of claim 1, wherein the plurality of hazards comprises at least one of: an earthquake; a tropical cyclone; a tornado; a tsunami; a volcanic eruption; a wildfire; flooding; excess rain; a storm; a winter storm; a landslide; an avalanche; a mudflow; an extreme temperature; a drought; a marine event; a bio hazard; an explosion; a bombing; a terrorist attack; and an active shooter.

* * * * *